2,849,405

LIQUID DEFOAMING COMPOSITIONS

John Henry Shott III, Wilmington, Del., and Charles Herbert Lighthipe, Bloomfield, and John Edward Ward, West Orange, N. J., assignors to Nopco Chemical Company, Harrison, N. J., a corporation of New Jersey No Drawing. Application December 28, 1953
Serial No. 400,802

15 Claims. (Cl. 252—358)

This invention relates, in general, to anti-foaming and/or defoaming compositions. More particularly, the invention relates to new and improved liquid anti-foaming and/or defoaming compositions.

The formation of foam during many industrial processes has been, and is presently, a serious problem to manufacturers. Thus, for example, substantial technical disadvantages arise in the manufacture of pulp and paper, in the manufacture and use of adhesives, in the formulation of latex base paints, in various fermentation processes and in very many other commercial and industrial processes because certain of the solutions and dispersions employed in those processes tend to froth and foam. In all of these processes precautions must be taken to prevent, or to at least deter, the formation of foam.

The disadvantages which accrue from the tendency of various solutions and dispersions to foam are of such magnitude that in the past, and at the present time, a substantial amount of research has been directed towards this problem. To this end, a very large number of compositions have been developed in the art and recommended for use as the anti-foaming and/or defoaming agents in those commercial and industrial processes which are adversely affected by the formation of foam. However, since the processes which require the use of an anti-foaming agent or a defoaming agent are so many and so varied and since the materials employed in these processes are so vastly different, few of the compositions suggested by the art have had all of the properties necessary to render them completely satisfactory for general anti-foaming and/or defoaming use. Primarily, the value of a new anti-foaming or defoaming agent is measured by its ability to prevent, or to at least inhibit, the formation of foam. However, for use in most industrial processes the stability of the proposed composition, and the stability of dilute aqueous emulsions thereof, are equally important to the complete suitability and acceptability of any material offered for anti-foaming or defoaming purposes. It was in this latter respect that very many prior art compositions failed for, while the compositions themselves were generally stable and aqueous emulsions thereof possessed adequate anti-foaming and defoaming properties, dilute emulsions of the prior art compositions were, for the most part, far less stable than is desirable and practical. However, the value of a proposed new defoaming composition, insofar as certain industries are concerned, does not depend upon the stability and the ability of dilute aqueous emulsions of the compositions to prevent or minimize the formation of foam. In these industries, the ability of a substantially water-free composition to accomplish adequate defoaming is the vital concern. Thus, for example, in the formulation of latex base paints and in the manufacture and use of adhesive materials the use of a substantially water-free defoaming agent is highly desirable. Insofar as these processes were concerned a large majority of the prior art defoamer compositions were, for the most part, unsuited for use since they either contained substantial percentages of water or they would only defoam effectively when used in the form of relatively dilute aqueous emulsions.

It is the object of this invention to provide new and improved anti-foaming and/or defoaming compositions.

A further object of this invention is to provide novel liquid anti-foaming and/or defoaming compositions.

More particularly, it is the object of this invention to provide liquid anti-foaming and/or defoaming compositions which are in their defoaming ability far superior to the conventional anti-foaming and defoaming compositions available today.

Other objects of the invention will be obvious and will, in part, appear hereinafter.

It has been found that compositions which comprise a monocarboxylic acid ester of a mono-hydroxy polyoxypropylene mono-ether of a low molecular weight monohydric alcohol blended with (1) a mixture of selected compositions produced by reacting certain dihydric alcohols with fatty acids or glycerides and (2) an aliphatic hydrocarbon, or a mixture of aliphatic hydrocarbons, are improved defoaming agents which are, in part, characterized by their liquid form at ordinary room temperatures and atmospheric pressure.

The compositions of this invention contain, as an essential ingredient thereof, an ester, or a mixture of esters, of the type produced by reacting a mono-hydroxy polyoxypropylene mono-ether of a low molecular weight, aliphatic monohydric alcohol with a relatively high molecular weight aliphatic monocarboxylic acid. These mono-hydroxy polyoxypropylene mono-ethers are compositions which are prepared, for example, by reacting equimolar proportions of a polypropylene glycol with a low molecular weight, aliphatic, monohydric alcohol, as, for example, an alcohol having a carbon chain length of from 1 to about 4 carbon atoms. The end product of this reaction will contain one free, unetherified terminal hydroxyl group. Esters are prepared by reacting these mono-hydroxy polyoxypropylene mono-ether compositions with a fatty acid having a carbon chain length of from 8 to about 22 carbon atoms. The fatty acids employed in preparing the indispensable ester constituent of our products are straight or branched chain aliphatic monocarboxylic acid compositions which are saturated, unsaturated or hydroxylated. Thus, for example, esters prepared by reacting mono-hydroxy polyoxypropylene mono-ethers with caprylic acid, caproic acid, palmitic acid, stearic acid, oleic acid, ricinoleic acid, etc. are fully suited for use in the formulation of our novel products. Since the actual preparation of the fatty acid ester of the mono-hydroxy polyoxypropylene mono-ether composition is not a part of the present invention, it is not intended that this disclosure be construed as limiting the invention to the use of esters produced by any particular method. Rather, esters, entirely suited for use, can be prepared by any of the various methods known in, and recognized by, the art. The mono-hydroxy polyoxypropylene mono-ethers from which the esters employed herein are prepared are water-insoluble materials. They are, however, soluble in many organic solvents, including, alcohols, ketones, toluene and gasoline. The esters which we ordinarily employ in the preparation of our novel products are those produced from mono-hydroxy polyoxypropylene mono-ethers having a viscosity within the range of from about 165 to 525 Saybolt Universal seconds at 100° F. Preferably, however, esters prepared from mono-hydroxy polyoxypropylene mono-ethers having viscosities within the range of from about 285 to 385 Saybolt Universal seconds at 100° F. are employed. In formulating our novel defoamer compositions, broadly, from about 5% by weight to about 15% by weight of a fatty acid ester of a monohydroxy polyoxypropylene mono-ether is employed. Preferably, however, each product of the invention contains from about 8% to about 12% by weight of such an ester.

Also present in the defoaming compositions of the present invention is a composition produced by reacting a composition selected from the group consisting of ethylene glycol, diethylene glycol and triethylene glycol, with a fatty acid or with a glyceride. The fatty acids employed in the production of these compositions are straight or branched chain, saturated, unsaturated or hydroxylated aliphatic monocarboxylic acids having a carbon chain length of from about 8 to about 22 carbon atoms. The glycerides used in preparing these compositions are those in which the fatty portion of the glyceride molecule consists largely of such fatty acid radicals. Thus, for example, compositions fully suited for use herein can be prepared either by reacting ethylene glycol, diethylene glycol or triethylene glycol with either (1) a fatty acid, such as, caprylic acid, caproic acid, lauric acid, palmitic acid, stearic acid, oleic acid or ricinoleic acid or (2) with a glyceride, the fatty portion of which consists largely of such acids, as, for example, peanut oil, coconut oil, soybean oil, cottonseed oil, etc. The procedure by which these compositions are produced is not a part of the present invention and, hence, compositions prepared by any method known as suitable in the art can be employed. In the preferred embodiment of the invention the compositions employed are those which have been produced by reacting ethylene glycol, diethyl glycol or triethylene glycol with a glyceride, as, for example, with peanut oil. The reaction by which such a composition is produced is generally carried out in the presence of an alkaline transesterification catalyst although products other than those produced in this manner are fully suited for use in our invention. The molar ratio in which the ethylene glycol, the diethylene glycol or the triethylene glycol and the fatty acid or the glyceride are reacted to give the product which we use herein can be varied to some extent. Ordinarily, however, in formulating our products we will use either (1) an ester prepared by the reaction of equimolar quantities of the low molecular weight ethylene glycol compound and fatty acid, or, (2) a product produced by reacting ethylene glycol, diethylene glycol or triethylene glycol, with a glyceride in a ratio of two moles of glycol compound to one mole of glyceride. Quite obviously, products of the latter type are not, strictly speaking, merely simple esters such as would be produced by reacting a mole of a dihydric alcohol with one or two moles of a fatty acid. Rather, they are mixtures containing substantial quantities of the alcohol-fatty acid ester in admixture with other materials, as for example, glyceryl esters. Furthermore, these products, if they are of the type produced in the presence of an alkaline transesterification catalyst, in all probability contain also certain relatively minor proportions of water-soluble alkali metal soap. However, since these mixtures consist primarily of fatty acid esters of ethylene glycol or of esters of a low molecular weight polyethylene glycol, they will be referred to hereinafter merely either as ethylene glycol esters, diethylene glycol esters or triethylene glycol esters. However, regardless of whether the ester employed is prepared using a fatty acid or using a glyceride, the defoamer produced will possess outstanding stability characteristics and exhibit excellent defoaming properties. This constituent of our novel compositions comprises broadly from about 5% by weight to about 30% by weight of said compositions. Preferably, each and every composition contains from about 8% to about 20% by weight thereof.

Another essential component of our composition is a product prepared by reacting a polyethylene glycol having a molecular weight of at least about 200, with a fatty acid or with a glyceride. The fatty acids employed in the preparation of these products are straight or branched chain, saturated, unsaturated or hydroxylated aliphatic monocarboxylic acids having a carbon chain length of from about 8 to about 22 carbon atoms. The glycerides which may be used in the preparation of these products are those in which the fatty portion of the glyceride molecule consists, for the most part, of such fatty acids. Examples of some of the esters whose use is contemplated in the present invention are the mono- and diesters prepared from polyethylene glycol (molecular weight 200) and lauric acid, palmitic acid, stearic acid, the fatty acids of coconut oil etc. and the mono and di-esters of polyethylene glycol (molecular weight 400) and lauric acid, stearic acid and oleic acid, the fatty acids of coconut oil etc. Moreover, products prepared by reacting polyethylene glycol (molecular weight 200), polyethylene glycol (molecular weight 400), polyethylene glycol (molecular weight 600) with peanut oil, coconut oil, cottonseed oil, soya bean oil, etc. in various molar proportions are also fully suited for use. Furthermore, in addition to using products prepared from polyethylene glycols, products prepared from derivatives of said glycols, such as, methoxy polyethylene glycols can also be used. The preferred materials employed in preparing our novel defoaming compositions are prepared by reacting, in equimolecular proportions, the relatively high molecular weight polyethylene glycol with a fatty acid, as, for example, with oleic acid or with the fatty acids obtained from coconut oil. This constituent of the product comprises broadly from about 5% to about 20% by weight of the defoaming agents. Preferably, however, the defoaming compositions of the invention contain from about 9% to about 20% by weight of this material.

Our novel compositions also contain aliphatic hydrocarbons or mixtures of aliphatic hydrocarbons, which are liquid at normal room temperatures and at atmospheric pressure and which have boiling points at least above about 150° F. Thus, liquid aliphatic hydrocarbons such as hexane, heptane, octane, paraffin oil, mineral seal oil, white mineral oil, kerosene, naphtha, etc. are examples of some of the hydrocarbon compositions which are fully suited for use in the practice of this invention. Moreover, if desired, a mixture of any two or more of these or other similar hydrocarbons can be employed. The liquid aliphatic hydrocarbon component of the composition comprises broadly from about 40% to about 80% by weight of the novel defoaming composition. However, the preferred products of this invention ordinarily contain from about 55% to about 65% by weight of the aliphatic hydrocarbon component.

The defoaming compositions of the present invention are of particular value since they are readily prepared without the aid of any special mixing equipment or apparatus. The various constituents of the product are merely charged into a suitable vessel in any sequence desired and mixed therein either manually or mechanically until the liquid product present is clear and homogeneous. Several products of the present invention, particularly those containing one or more ethylene glycol or polyethylene glycol esters of the type produced using a fatty acid rather than a glyceride, are somewhat cloudy. It has been found that the incorporation of a liquid composition which is characterized by the presence therein of a carboxylic acid group, or a multiplicity of carboxylic acid groups, into the cloudy product, together with an alkaline stabilizing composition, transforms the cloudy product into a brilliantly clear liquid. In some compositions of the invention, the use of a mixture of a liquid carboxylic acid material and an alkali is wholly and entirely unnecessary. However, when the product produced is somewhat cloudy the addition thereto of a liquid carboxylic acid composition and an alkali is highly recommended. The expression "liquid carboxylic acid" composition employed herein includes fatty acids which are liquid at room temperature and which have carbon chain lengths of from about 6 to about 22 carbon atoms and mixtures thereof. Furthermore, also included within the purview of this expression are blends of liquid fatty acids and normally solid rosin acids and normally solid fatty acids having carbon chain lengths of from about 6 to about 22 carbon atoms admixed in such proportions that the final mixture thereof is itself liquid at ordinary room temperatures. The liquid fatty acids suitable for use herein are chiefly unsaturated fatty acids, such as, oleic acid. However, the low molecular weight, liquid, saturated fatty acids as well as liquid mixtures of normally solid, higher molecular weight, saturated fatty acids with other fatty acids, both saturated and unsaturated, which are themselves liquid are also effective in removing the cloudiness which is noted in certain products of the present invention. Thus, acids such as caproic, caprylic, oleic, linoleic, the fatty acids of coconut oil and mixtures thereof, etc. are fully suited for use in the formulation of our novel liquid defoaming agents. Moreover, the use of normally solid carboxylic acids such as lauric, myristic, palmitic, stearic acids, abietic acid etc. in admixture with a suitable liquid carboxylic acid type composition in such proportions that the mixtures thereof are liquid is also within the scope of the invention. It has been found, also, that tall oil, which is essentially a mixture of rosin acids and non-conjugated unsaturated fatty acids, is particularly well suited for use. In the preferred embodiment of the invention, however, oleic acid is employed. The quantity of carboxylic acid type composition used in formulating the various products of the invention in any particular instance will vary. The use of such a material in certain of the present products is entirely unnecessary. Generally, however, when needed, from about 3% to about 10% by weight of the carboxylic acid composition will satisfactorily bring about the desired result. If necessary, the carboxylic acid composition can be added to the products of the invention in quantities ranging up to about 15% by weight without materially affecting the defoaming characteristics of the product. The carboxylic acid type composition, in admixture with the alkali, can be added to a product which is, in and of itself, clear and homogeneous if desired ordinarily without decreasing to any extent the defoaming characteristics of the composition. The alkali which is employed with the liquid carboxylic acid compositions in certain of our formulations can be any known and recognized alkaline stabilizing composition. Particularly well suited for use are alkaline materials, such as, sodium hydroxide, potassium hydroxide, sodium methylate, etc., or an amine such as triethanolamine. The quantity of alkali which is used in the formulation of any particular product of our invention can be varied within rather wide limits. In general, the maximum amount of alkali which can be employed will depend upon the quantity of the particular carboxylic acid composition with which it is used. Since we do not wish to have any free alkali present in our novel products, the amount of alkali used should not exceed that amount which is theoretically required to completely react with the free carboxylic acid groups of the acid present. Broadly, the alkali can be used in quantities ranging from about 0.7% by weight to about 2.0% by weight of the final product. Preferably, the quantity of alkali used will vary within the range of from about 0.8% by weight to about 1.7% by weight. However, both the broad range and, hence, the preferred range disclosed herein are subject to the limitation that the quantity of alkali used in formulating our products should never exceed the quantity theoretically required to react with the free carboxylic acid groups present.

As disclosed heretofore, the sequence in which the constituents which comprise the products of the present invention are admixed is not at all important or critical to the operability of the invention. Thus, if desired, the ester of the mono-hydroxy polyoxypropylene monoether of the low molecular weight monohydric alcohol can be added to the liquid hydrocarbon, following which the ethylene glycol ester and/or the polyethylene glycol esters, individually or in admixture with each other, can be added thereto. The materials can be admixed, however, in any other sequence desired. Furthermore, although the constituent ingredients which comprise the present products may be, and are preferably blended together, at room temperature and atmospheric pressure, the blending of the materials into a homogeneous product in certain instances can be facilitated, to some extent, when the constituents are admixed at a temperature slightly above ordinary room temperatures, as, for example, at temperatures up to about 90° F. In the preferred embodiment of the invention, the actual blending is carried out at a temperature of about 75° F. The blended product will, in most cases, be a clear liquid product. However, if, as discussed heretofore, the product is not clear, the addition of a mixture of a carboxylic acid type composition and an alkali to the blend and the complete incorporation of the mixture into the blend will render it brilliantly clear immediately. After standing for extended periods of time at room temperature, no perceptible change either in the physical characteristics or in the chemical properties of the composition will be observed.

Since the products of the present invention function effectively as anti-foaming and/or defoaming agents in a very large variety of processes, it is impossible to set forth precisely proportions which will adequately define the quantities needed to achieve the desired effect in all cases. The quantity of defoamer required will depend particularly upon the process in which it is to be used. Thus, for example, for use in the pulp and paper industry from about 0.05% to about 0.1% by weight of our products, based on the weight of dry pulp, are generally employed. For use in the formulation of latex base paints ordinarily about 1.0% by weight of our products, based on the weight of the solids in the latex base paint, will be used. However, the manufacturer can most effectively determine by experimentation in a trial run, the quantity of our novel composition which, most effectively and efficiently, will prevent or inhibit the foaming encountered in his particular process.

The properties of the present products which render them extremely valuable as commercial defoaming and/or anti-foaming agents are many and varied. Thus, for example, all of our products are free flowing liquid compositions and, as such, they are very easily handled in plant scale procedures. Many defoaming compositions disclosed in the art were, due to their paste-like consistency, difficult to manipulate. Furthermore, unlike a very large majority of the defoaming agents disclosed in the art, the products of the present invention are manufactured for and sold and shipped to the ultimate consumer in a substantially water-free state. When these products are to be employed in one of the many processes whose operation procedures call for the addition of the defoamer in the form of a relatively dilute aqueous emulsion, as, for example, in the manufacture of pulp and paper, they are, for the most part, readily emulsified in water with a minimum amount of agitation. However, the products of this invention are especially designed for, and will have particular application, in those processes where a substantially water-free defoaming agent is either preferably or necessarily employed. It has been found that not only have dilute aqueous emulsions of the present products completely satisfactory defoaming properties but also that the products are, in and of themselves, outstanding defoamers. Thus, for example, the products of this invention are eminently well suited for use in the processes involved in the formulation of latex base paints, or in other similar processes, in which the addition of water, through the medium of a dilute aqueous emulsion of a defoamer, is undesirable. When the substantially water-free products of the present invention are used in such a process the formation of foam is minimized to a far greater extent than when prior art defoamers, or dilute aqueous emulsions thereof, are used. Thus, insofar as general defoaming efficiency is concerned, the products of the present invention are far superior to the conventional defoamers of the art.

The precise reason why our products function so successfully as defoaming agents is not known. However, it is believed that the outstanding results observed are due to the combination of the aliphatic monocarboxylic acid ester of the mono-hydroxy polyoxypropylene mono-ether of the low molecular weight, aliphatic monohydric alcohol with the other ingredients which comprise the products in the proportions set forth herein.

For a fuller understanding of the nature and objects of this invention, reference should be had to the following examples which are given merely as further illustrations of the invention and are not to be construed in a limiting sense. All parts are given by weight.

*Example I*

In this example 9.75 parts of an ester prepared by reacting 81.4 parts of a mono-hydroxy polyoxypropylene mono-ether of a low molecular weight monohydric alcohol, prepared by reacting a polypropylene glycol with butanol, said mono-ether composition having a viscosity of about 385 Saybolt Universal seconds at 100° F. (Ucon LB 385, sold by Union Carbide and Carbon Corporation, New York, New York), and 19.9 parts of oleic acid were added to 61.5 parts of 28° Bé. paraffin oil at room temperature. To this mixture, 9.75 parts of a product prepared by reacting 79.4 parts (0.09 mole) of peanut oil and 19.0 parts (0.18 mole) of diethylene glycol were added. Thereafter 11.60 parts of an ester prepared by reacting 51.2 parts of polyethylene glycol (molecular weight of 200) with 53.4 parts of coconut oil fatty acids were added to, and admixed with, the mixture. The product at this time was a cloudy liquid. Thereafter 5.85 parts of tall oil and 1.55 parts of triethanolamine were added to, and blended with, the cloudy liquid mixture. The product obtained was a brilliantly clear, free-flowing, but slightly viscous, liquid which was readily dispersible in water. Aqueous dispersions of this product were relatively stable even in dilute concentration.

This composition was evaluated by testing its defoaming effectiveness in synthetic white water having approximately the same composition as the white water which is found in the average paper mill. The white water was prepared by thoroughly admixing 99.111 parts of water, 0.089 part of rosin size (Hercules XXX brand of sodium rosinate, Hercules Powder Company, Wilmington, Delaware), 0.005 part of anhydrous calcium chloride, 0.493 part of sodium silicate, 0.277 part of anhydrous aluminum sulfate and 0.025 part of a preservative. In the preparing of the white water, the amount of alum used is varied to adjust the pH of the solution to 5.0. This defoamer test was carried out in a tall form beaker of 1000 cc. capacity, the beaker having a line marked on the side thereof about 4½ inches from the bottom of the beaker. On one side and near the bottom of the beaker, there was a side arm outlet which was connected by means of a rubber hose to a centrifugal pump. The pump was employed to continuously cycle the white water from the beaker through the pump and through an outlet hose attached to said pump and back into the beaker at such a high rate of speed that the solution remaining in the beaker was struck by the re-entering solution with such force that the formation of foam was thereby induced. The circulating white water re-entered the beaker and struck the surface of the solution therein at an angle of ninety degrees and it entered from a point about three inches above the surface of the solution.

In conducting this test, 500 cc. of synthetic white water (pH 5.0) containing 10 ml. of 0.5% emulsion of the product of Example I was employed. This solution was placed in the 1000 cc. capacity beaker which has been described heretofore. The level of the solution in the beaker was about 1¼ inches below the 4½ inch mark previously placed on the beaker. The side arm outlet of the beaker was connected to the circulating pump by means of a section of rubber hose and the pump was started. Foam immediately develops in the beaker. In evaluating the defoaming effectiveness of any product by this method, the length of time elapsing between starting the pump and the rise of the foam to the 4½ inch mark on the beaker was recorded. It was found that only after the expiration of about 360 seconds did the foam of the white water solution containing the product of Example I reach the 4½ inch mark on the beaker. Using synthetic white water (pH 5.0) which contained no defoaming agent of any kind, the foam rises to the 4½ inch mark in less than 15 seconds. This result clearly shows that the composition of Example I possesses outstanding synthetic white water defoaming properties.

The defoaming ability of this product was thereafter tested in latex by the following procedure. To 200 ml. of Dow Latex 762–K, an aqueous emulsion (48% solids) of a copolymer of styrene and butadiene (The Dow Chemical Co., Midland, Michigan), we added 1.0 gram of the product of this example. This mixture was placed in a metal container. The container which we employed was a metal container of the type normally employed when a solution is to be agitated with a high speed mixer. The mixture was agitated for five minutes in this container using a two-speed Hamilton-Beach Number Thirty Drinkmaster mixer set at maximum speed. At the end of this time, the foaming solution in the container was slowly and carefully poured into a graduated cylinder of 16 ounce capacity. In order to accomplish the removal of substantially all of the solution from the container, the container was allowed to drain into the cylinder for thirty-five seconds. The volume of the solution in the cylinder was observed at this time to be 455 ml. In a control test, carried out in precisely the same manner on the same quantity of latex, except that no defoamer of any type whatsoever was employed, the volume of the latex solution after mixing was 650 ml. These solutions were thereafter observed and the volumes thereof recorded ten, twenty and thirty minutes later. At the end of ten minutes, the volume of the "foamed" control sample was 630 ml. and the volume of the defoamer-containing solution was 450 ml. After twenty minutes, the volume of the "foamed" control sample was 620 ml. and the volume of the solution containing the defoamer was 400 ml. At the end of thirty minutes, the volume of the "foamed" control solution was 600 ml. and the volume of the defoamer containing solution was 375 ml. These results demonstrate the defoaming ability of this product, in and of itself. Furthermore, these results clearly indicate the usefulness of this product in minimizing the formation of foam in the steps involved in the manufacture of latex-base paints.

The defoaming ability of this product was also tested and evaluated in a latex system by still another method. For the purposes of this test a 100 ml. graduated cylinder which was truncated at the 70 ml. mark was employed. To this cylinder, 20 grams of Dow Latex 762–K were added. A single stirrer attached to a one disc Gilbert stirrer was immersed in this solution in such a manner that the top of the truncated graduated cylinder was flush with the bottom of the motor of the stirrer. With the stirrer so immersed therein, the free surface of the solution was at the 21 ml. mark on the graduated cylinder. The Gilbert stirrer was started at its highest speed and the solution immediately began to foam. The volume of the defoamer-free, foaming solution was recorded 10, 20 and 30 seconds after the stirrer was started. This procedure was repeated. The latex solution in this case contained 1.0% by weight, based on the weight of solids in the latex, of the product of this example. The product in this test was added in the form of a 20% aqueous emulsion of defoamer. The volume of this defoamer-containing solution during stirring was observed and recorded every ten seconds for the first minute, every fifteen seconds for the second minute and thereafter every minute for the next eight minutes. It was observed that at the end of thirty seconds the volume of the solution containing no defoamer was 65 ml. At the end of thirty seconds, the volume of the solution containing the defoamer was 37 ml. and at the end of 600 seconds of continuous high speed stirring the volume of the solution containing the defoamer had risen progressively but very slowly to the 63 ml. level.

These results are clearly indicative of the usefulness of the present products as defoamers in latex-containing systems. Thus, whereas the defoamer-free latex solution rose to a level of 65 ml. after only 30 seconds of stirring, the latex solution containing our novel composition had not reached that level even after the expiration of 600 seconds.

*Examples II and III*

In Example II, a composition was prepared by the method of, and using the same materials in the same proportions as set forth in, Example I, except that the 9.75 parts by weight of the product prepared by reacting 79.4 parts by weight of peanut oil with 19.0 parts by weight of diethylene glycol which were employed in Example I were replaced by 9.75 parts by weight of a product prepared by reacting 73.6 parts by weight of coconut oil with 24.4 parts by weight of diethylene glycol and that the tall oil was replaced by oleic acid.

In Example III, a composition was prepared by the method of, and using the same materials in the same proportions as set forth in, Example I, except that the 61.5 parts by weight of paraffin oil employed in Example I were replaced by 61.5 parts by weight of mineral seal oil and the tall oil was replaced by oleic acid.

The products of Examples II and III were tested in synthetic pH 5.0 white water in the manner set forth in Example I except that rather than using 10 ml. of a 0.5% emulsion of the product as the defoamer, 1 ml., 2 ml., and 3 ml. of a 0.25% emulsion of each was used. The results obtained using the products of Example II were as follows: 1 ml. of 0.25% emulsion kept the foam from rising to the marked level for a period of 20 seconds; 2 ml. of 0.25% emulsion kept the foam from rising to the marked level for a period of 45 seconds; 5 ml. of 0.25% emulsion kept the foam from rising to the marked level for a period of 75 seconds. The results obtained using the products of Example III were as follows: 1 ml. of 0.25% emulsion kept the foam from rising to the marked level for a period of 45 seconds; 2 ml. of 0.25% emulsion kept the foam from rising to the marked level for a period of 100 seconds; 5 ml. of 0.25% emulsion kept the foam from rising to the marked level for a period of 145 seconds. The foam produced in synthetic white water (pH 5.0) containing no defoaming agent of any type reached the marked level in about 8 seconds.

*Example IV*

In this example, 10.0 parts of an ester prepared by reacting equimolar proportions of a mono-hydroxy polyoxypropylene mono-ether prepared by reacting a polypropylene glycol with butanol, said mono-hydroxy-mono ether composition having a viscosity of about 285 Saybolt Universal seconds at 100° F. (Ucon LB 285, sold by Union Carbide and Carbon Corporation, New York, New York) and oleic acid were added to 63.0 parts of 28° Bé. paraffin oil. To this mixture, 10.0 parts of a product, produced by reacting 79.4 parts of peanut oil and 19.0 parts of diethylene glycol, and 11.9 parts of an ester prepared by reacting in equimolar proportions polyethylene glycol (molecular weight of 300) and lauric acid were added. The product at this time was a slightly viscous, cloudy liquid. Subsequently, 6.0 parts of tall oil and 1.0 part of triethanolamine were added to, and blended with, the mixture. The product thus obtained was a brilliantly clear, slightly viscous liquid. This product was readily dispersible in water and the aqueous emulsions thereof were relatively quite stable.

The defoaming effectiveness of the product of Example IV in synthetic white water (pH 5.0) was tested in precisely the same manner as was the composition of Example I. It was found that whereas the head of foam produced using synthetic white water containing no defoaming agent rose in the beaker to the 4½ inch mark in less than 15 seconds, the head of foam produced by recirculating synthetic white water containing 10 ml. of 0.5% emulsion of the defoamer of Example II rose to the 4½ inch mark on the beaker only after 99 seconds had expired. These results clearly indicate that the composition of this example possesses completely satisfactory defoaming characteristics.

*Example V*

In this example, 10.0 parts of a product produced by reacting 79.4 parts of peanut oil and 19.0 parts of diethylene glycol were added to, and blended with, 63.0 parts of 28° Bé. paraffin oil at room temperature. To this mixture, 10.0 parts of an ester, prepared by reacting equimolar proportions of a mono-hydroxy polyoxypropylene mono-ether of butanol having a viscosity of 285 Saybolt Universal seconds at 100° F. (Ucon LB 285) and oleic acid, and 11.9 parts of an ester prepared by reacting equimolar proportions of methoxy polyethylene glycol (molecular weight of 350) with oleic acid were added to the mixture. Thereafter, 6.0 parts of tall oil and 0.9 part of triethanolamine were added to the product. The composition thus produced was a clear, slightly viscous liquid. It was readily dispersible in water and dispersions thereof, even at relatively dilute concentrations, were quite stable.

The defoaming effectiveness of this composition in synthetic white water (pH 5.0) was tested in the manner set forth in Example I. It was found that, in synthetic white water (pH 5.0), the head of foam produced in the circulatory system rose to the 4½ inch mark on the beaker only after 103 seconds had expired. The foam formed by synthetic white water (pH 5.0) containing no defoamer whatsoever reached the 4½ inch mark in a period of less than about 15 seconds. These results clearly indicate that this product is completely satisfactory for use as a defoamer in those steps involved in the manufacture of pulp and paper.

*Example VI*

In this example, 10.0 parts of a product prepared by reacting 79.4 parts of peanut oil and 19.0 parts of diethylene glycol were added to 63 parts 28° Bé. paraffin oil and admixed therewith at a temperature of about 75° F. To this mixture, 10.0 parts of an ester, prepared by reacting 81.4 parts of a mono-hydroxy polyoxypropylene mono-ether of butanol (Ucon LB 385), said composition having a viscosity of 385 Saybolt Universal seconds at 100° F. and 19.9 parts of oleic acid, and 12.0 parts of a product produced by reacting two moles of polyethylene glycol (molecular weight of 200) and one mole of coconut oil were added. The product thus produced was a clear, slightly viscous liquid. This product was readily dispersible in water and relatively dilute dispersions thereof exhibited outstanding stability.

The defoaming effectiveness of this composition was evaluated in synthetic white water (pH 5.0) by the method set forth heretofore in Example I. It was found that the incorporation of 10 ml. of a 0.5% emulsion of the product of this example into 500 cc. of synthetic white water (pH 5.0) prevented the head of foam produced when white water was continuously circulated through the system from rising to 4½ inch mark for a period of about 112 seconds. Using synthetic white water (pH 5.0) containing no defoaming composition whatsoever the head of foam produced rose to the 4½ inch mark in a period which was less than about 15 seconds. These results clearly show that the composition of this example is an outstanding defoaming agent.

Having described our invention what we claim as new and desire to secure by Letters Patent is:

1. A liquid defoamer composition comprising (1) from about 40% to about 80% by weight of a liquid aliphatic hydrocarbon having a boiling point of at least 150° F., (2) from about 5% to about 15% by weight of an ester produced by reacting a mono-hydroxy polyoxypropylene mono-ether of a low molecular weight aliphatic monohydric alcohol having a carbon chain length of from 1 to about 4 carbon atoms, with an aliphatic monocarboxylic acid having a carbon chain length of from about 8 to about 22 carbon atoms, (3) from about 5% to about 30% by weight of a product selected from the class consisting of esters and mixtures containing same produced by reacting a glycol selected from the class consisting of ethylene glycol, diethylene glycol and triethylene glycol with a material selected from the class consisting of aliphatic monocarboxylic acids having a carbon chain length of from about 8 to about 22 carbon atoms and glycerides, the fatty portion of which consists chiefly of fatty acid radicals having a carbon chain length of from about 8 to about 22 carbon atoms and (4) from about 5% to about 20% by weight of a product selected from the class consisting of esters and mixtures containing same produced by reacting a polyethylene glycol having a molecular weight of at least about 200 with a material selected from the class consisting of aliphatic monocarboxylic acids having a carbon chain length of from about 8 to about 22 carbon atoms and glycerides, the fatty portion of which consists chiefly of fatty acid radicals having a carbon chain length of from about 8 to about 22 carbon atoms.

2. The composition of claim 1 wherein from about 3% to about 15% by weight of a liquid carboxylic acid composition selected from the class consisting of tall oil, liquid aliphatic carboxylic acids having a carbon chain length of from about 6 to about 22 carbon atoms, and liquid mixtures of said liquid aliphatic carboxylic acids with normally solid fatty acids having a carbon chain length of from about 6 to about 22 carbon atoms is present and wherein from about 0.7% to about 2.0% by weight of an alkali which forms a water soluble soap with said carboxylic acid composition is present, the quantity of alkali present being not greater than the stoichiometric equivalent of the quantity of acid present.

3. A liquid defoamer composition comprising (1) from about 55% to about 65% by weight of a liquid aliphatic hydrocarbon having a boiling point of at least 150° F., (2) from about 8% to about 12% by weight of an ester produced by reacting a mono-hydroxy polyoxypropylene mono-ether of a low molecular weight aliphatic monohydric alcohol having a carbon chain length of from 1 to about 4 carbon atoms, with an aliphatic monocarboxylic acid having a carbon chain length of from about 8 to about 22 carbon atoms, (3) from about 8% to about 20% by weight of a product selected from the class consisting of esters and mixtures containing same produced by reacting a glycol selected from the class consisting of ethylene glycol, diethylene glycol and triethylene glycol with a material selected from the class consisting of aliphatic monocarboxylic acids having a carbon chain length of from about 8 to about 22 carbon atoms and glycerides, the fatty portion of which consists chiefly of fatty acid radicals having a carbon chain length of from about 8 to about 22 carbon atoms and (4) from about 9% to about 20% by weight of a product selected from the class consisting of esters and mixtures containing same produced by reacting a polyethylene glycol having a molecular weight of at least about 200 with a material selected from the class consisting of aliphatic monocarboxylic acids having a carbon chain length of from about 8 to about 22 carbon atoms and glycerides, the fatty portion of which consists chiefly of fatty acid radicals having a carbon chain length of from about 8 to about 22 carbon atoms.

4. A liquid defoamer composition comprising (1) from about 55% to about 65% of a liquid aliphatic hydrocarbon having a boiling point of at least 150° F., (2) from about 8% to about 12% by weight of an ester produced by reacting a mono-hydroxy polyoxypropylene monoether of a low molecular weight aliphatic monohydric alcohol having a carbon chain length of from 1 to about 4 carbon atoms, with an aliphatic monocarboxylic acid having a carbon chain length of from about 8 to about 22 carbon atoms, (3) from about 8% to about 20% by weight of an ester-containing product produced by reacting a glycol selected from the class consisting of ethylene glycol, diethylene glycol and triethylene glycol with a glyceride, the fatty portion of which consists chiefly of fatty acid radicals having a carbon chain length of from about 8 to about 22 carbon atoms and (4) from about 9% to about 20% by weight of a product selected from the class consisting of esters and mixtures containing same produced by reacting a polyethylene glycol having a molecular weight of at least about 200 with a material selected from the class consisting of aliphatic monocarboxylic acids having a carbon chain length of from about 8 to about 22 carbon atoms and glycerides, the fatty portion of which consists chiefly of fatty acid radicals having a carbon chain length of from about 8 to about 22 carbon atoms.

5. The composition of claim 4 wherein from about 3% to about 10% by weight of a liquid carboxylic acid composition selected from the class consisting of tall oil, liquid aliphatic carboxylic acids having a carbon chain length of from about 6 to about 22 carbon atoms, and liquid mixtures of said liquid aliphatic carboxylic acids with normally solid fatty acids having a carbon chain length of from about 6 to about 22 carbon atoms is present and wherein from about 0.8% to about 1.7% by weight of an alkali which forms a water-soluble soap with said carboxylic acid composition is present, the quantity of alkali present being not greater than the stoichiometric equivalent of the quantity of acid present.

6. A liquid defoamer composition comprising (1) from about 55% to about 65% by weight of a liquid aliphatic hydrocarbon having a boiling point of at least 150° F., (2) from about 8% to about 12% by weight of an ester produced by reacting a mono-hydroxy polyoxypropylene mono-ether of a low molecular weight aliphatic monohydric alcohol having a carbon chain length of from 1 to about 4 carbon atoms, with an aliphatic monocarboxylic acid having a carbon chain length of from about 8 to about 22 carbon atoms, (3) from about 8% to about 20% by weight of an ester-containing product produced by reacting a glycol selected from the class consisting of ethylene glycol, diethylene glycol and triethylene glycol with a glyceride, the fatty portion of which consists chiefly of fatty acid radicals having a carbon chain length of from about 8 to about 22 carbon atoms and (4) from about 9% to about 20% by weight of an ester produced by reacting a polyethylene glycol having a molecular weight of at least about 200 with an aliphatic monocarboxylic acid having a carbon chain length of from about 8 to about 22 carbon atoms.

7. A liquid defoamer composition comprising (1) from about 55% to about 65% by weight of 28° Bé. paraffin oil (2) from about 8% to about 12% by weight of an ester produced by reacting a mono-hydroxy polyoxypropylene mono-ether of a low molecular weight aliphatic monohydric alcohol having a carbon chain length of from 1 to about 4 carbon atoms, with an aliphatic monocarboxylic acid having a carbon chain length of from about 8 to about 22 carbon atoms (3) from about 8% to about 20% by weight of an ester-containing product produced by reacting one mole of peanut oil with two moles of diethylene glycol and (4)

from about 9% to about 20% by weight of a product selected from the class consisting of esters and mixtures containing same produced by reacting a polyethylene glycol having a molecular weight of at least about 200 with a material selected from the class consisting of aliphatic monocarboxylic acids having a carbon chain length of from about 8 to about 22 carbon atoms and glycerides, the fatty portion of which consists chiefly of fatty acid radicals having a carbon chain length of from about 8 to about 22 carbon atoms.

8. The composition of claim 5 wherein from about 3% to about 10% by weight of a liquid carboxylic acid composition selected from the class consisting of tall oil, liquid aliphatic carboxylic acids having a carbon chain length of from about 6 to about 22 carbon atoms and liquid mixtures of said liquid aliphatic carboxylic acids with normally solid fatty acids having a carbon chain length of from about 6 to about 22 carbon atoms is present and wherein from about 0.8% to about 1.7% by weight of triethanolamine present being not greater than the stoichiometric equivalent of the quantity of acid present.

9. The composition of claim 5 wherein the liquid aliphatic hydrocarbon component is 28° Bé. paraffin oil.

10. The composition of claim 4 wherein the viscosity of the mono-hydroxy polyoxypropylene mono-ether used in making the composition is within the range of from about 285 to about 385 Saybolt Universal seconds at 100° F.

11. The composition of claim 10 wherein the monoester produced from a polyethylene glycol having a molecular weight of at least about 200 is prepared from a polyethylene glycol having a molecular weight of about 300 and lauric acid.

12. The composition of claim 10 wherein the monoester produced from a polyethylene glycol having a molecular weight of at least about 200 is prepared from a methoxy polyethylene glycol having a molecular weight of about 350 and oleic acid.

13. The composition of claim 10 wherein the product produced from a polyethylene glycol having a molecular weight of at least about 200 is prepared by reacting about two moles of a polyethylene glycol having a molecular weight of about 200 with one mole of coconut oil.

14. The composition of claim 10 wherein from about 3% to about 10% by weight of tall oil is present and wherein from about 0.8% to about 1.7% by weight of triethanolamine is present, the quantity of triethanolamine present being not greater than the stoichiometric equivalent of the quantity of acid present.

15. The composition of claim 10 wherein the product produced from a polyethylene glycol having a molecular weight of at least about 200 is prepared by reacting a polyethylene glycol having a molecular weight of about 200 with coconut oil fatty acids.

References Cited in the file of this patent

UNITED STATES PATENTS

| | | |
|---|---|---|
| 2,668,150 | Luvisi | Feb. 2, 1954 |
| 2,753,309 | Figdor | July 3, 1956 |

OTHER REFERENCES

Chemicals by Glyco—Glyco Products Co., N. Y. (1948), page 16.